(12) United States Patent
Briscoe et al.

(10) Patent No.: US 8,095,615 B2
(45) Date of Patent: *Jan. 10, 2012

(54) SYSTEM FOR SYNCHRONIZING SIGNALS INCLUDING A SLAVE SIGNAL GENERATOR GENERATING ELAPSED TIME DATA WITH RESPECT TO AN INITIAL TIME POINT AND RELATED METHODS

(75) Inventors: Paul E. Briscoe, Toronto (CA); Leigh A. Whitcomb, Toronto (CA); Michel A. Poulin, Pickering (CA)

(73) Assignee: Harris Corporation, Melbourne, FL (US)

( * ) Notice: Subject to any disclaimer, the term of this patent is extended or adjusted under 35 U.S.C. 154(b) by 30 days.

This patent is subject to a terminal disclaimer.

(21) Appl. No.: 12/612,786

(22) Filed: Nov. 5, 2009

(65) Prior Publication Data
US 2010/0115047 A1    May 6, 2010

(30) Foreign Application Priority Data
Nov. 5, 2008  (EP) .................................... 08019378

(51) Int. Cl.
*G06F 15/16*  (2006.01)
*G06F 15/173*  (2006.01)
*G06F 15/177*  (2006.01)

(52) U.S. Cl. ........... 709/208; 370/503; 331/18; 331/174
(58) Field of Classification Search .................. 709/208, 709/217–224; 370/503; 331/18, 174
See application file for complete search history.

(56) References Cited

U.S. PATENT DOCUMENTS

| | | | |
|---|---|---|---|
| 7,346,133 B2 * | 3/2008 | Tatem, Jr. | 375/344 |
| 7,589,595 B2 * | 9/2009 | Cutler | 331/18 |
| 7,876,790 B2 * | 1/2011 | Cho et al. | 370/503 |
| 2005/0207387 A1 | 9/2005 | Middleton et al. | 370/347 |
| 2006/0153245 A1 * | 7/2006 | Schultze | 370/503 |
| 2008/0068103 A1 * | 3/2008 | Cutler | 331/74 |
| 2008/0122986 A1 | 5/2008 | Diederichsen | 348/705 |
| 2009/0034672 A1 * | 2/2009 | Cho et al. | 375/364 |
| 2009/0113183 A1 * | 4/2009 | Barford et al. | 712/220 |
| 2009/0168808 A1 * | 7/2009 | Cho et al. | 370/503 |
| 2009/0231191 A1 * | 9/2009 | Wu et al. | 342/357.09 |
| 2010/0118895 A1 * | 5/2010 | Radulescu | 370/503 |
| 2010/0135334 A1 * | 6/2010 | Briscoe et al. | 370/503 |

FOREIGN PATENT DOCUMENTS

| | | |
|---|---|---|
| EP | 1513044 | 3/2005 |
| WO | 2006/110960 | 10/2006 |

OTHER PUBLICATIONS

Mohl, "IEEE1588 and Switches", IEEE Standard Precision Time Protocol, Nov. 2005, pp. 1-5.

* cited by examiner

*Primary Examiner* — Haresh N Patel
(74) *Attorney, Agent, or Firm* — Allen, Dyer, Doppelt, Milbrath & Gilchrist, P.A.

(57) ABSTRACT

A system replaces the current "Genlock" reference signals and distribution architectures used in media and broadcasting use an IP network and distributed timekeeping service, such as ISO/IEC 61588 or IEEE1588. In such a system, a master and multiple slave devices are used to distribute precision time and phase information to synchronize equipment and systems. The method described herein allows the generation of a signal standard and format with a single distribution system. In addition, the method allows this distribution to be accomplished over an IP network despite the non-deterministic performance of such networks. The method also allows the deterministic generation of signals at slave devices.

13 Claims, 3 Drawing Sheets

SYSTEM FOR SYNCHRONIZING SIGNALS INCLUDING A SLAVE SIGNAL GENERATOR GENERATING ELAPSED TIME DATA WITH RESPECT TO AN INITIAL TIME POINT AND RELATED METHODS

FIELD OF THE INVENTION

The present invention relates to field of signal processing and, more particularly, to systems for synchronizing unrelated reference signals associated with information signals (e.g., video or audio signals) originating from multiple sources, such as at geographically different locations and/or in different formats, and related methods.

BACKGROUND OF THE INVENTION

There are many situations in which signals from sources at different locations need to be integrated or combined, e.g., a video signal and its associated audio signal. Another example is an video signal received from a satellite feed or microwave repeater relay network which may have its associated audio signal transmitted to the broadcast facility over land lines (e.g., telephone lines). In other cases a remote video feed may be integrated with a local video signal, e.g., in a news broadcast or a live interview between the broadcast facility and a remote location.

In general, video and audio or multimedia equipment uses an external "Genlock" reference signal for synchronization. Genlock is commonly used in video post-production, nonlinear editing, and broadcast studios, etc. Its use ensures that a video and audio or multimedia equipment's information output is locked (LOCK) to an externally generated signal (GEN), so that the studio's devices (e.g., cameras, videotape recorders, character or title generators, etc.) work together correctly. Through Genlock, the information output may be synchronized to an external source. The Genlock reference signal generally takes the form of a normal video/audio information signal, but without any program content.

A Genlock reference signal is produced by a sync generator that generates a signal of the same frequency as an information signal, but with precise timing signals that are not subject to frequency drift or time base errors which might affect the information signal. In an analog color video signal, for example, the sync generator generates horizontal sync, vertical sync, color reference, burst flag and blanking pulses, typically as a color black reference signal, at precise intervals corresponding to the nominal specifications for the format of the particular signal being processed.

While signals that conform to the NTSC standard or to the PAL standard are still in use today and will continue to be for the foreseeable future, the advent of digital technologies has enabled the widespread use of Standard Definition and High Definition television, both in the baseband and compressed (MPEG-2, -4, etc.) domains. The new digital TV standards utilize digital broadcasting/multimedia equipment that needs to be synchronized.

Video signals originating from and within a broadcast facility are Genlocked to the reference signal generated by a master generator, which provides a common timing reference for aligning the various signals. The phasing of two information signals of the video type involves multiple levels of alignment. First, the vertical alignment to the nearest vertical sync pulse is performed. Then, the correct horizontal line is aligned. On the next level, each picture is synchronized spatially (horizontal and vertical). In an analog composite system, additional phasing of the subcarrier is finally carried out to achieve the correct color reproduction.

In modern digital systems, the concept of subcarrier no longer exists and only horizontal and vertical phasing is required. Two signals which exhibit vertical and horizontal (and subcarrier, if applicable) alignment are said to by synchronous, and can be used together without further timing adjustment in a production process such as switching, mixing, superimposition, etc.

In some situations it may become necessary to combine information signals originating from sources at different locations. The lengths of the signal paths may differ, such as where a video signal is relayed via satellite and its associated audio signal is transmitted over land lines, which causes a delay differential between the signals, or independent video signals containing information relating to a common event. For example, for a local interviewer interviewing a person at remote location, or a panel discussion between panelists in different cities, may arrive at the broadcast facility at different times if the signal paths differ. Each remote signal source may be locked to an independent reference signal, which may not be in precise alignment with other unrelated reference signals or the reference signal used by the broadcast facility.

The Society of Motion Picture and Television Engineers (SMPTE) and the European Broadcasting Union (EBU) are looking into developments in the broadcast infrastructure synchronization (see, e.g. www.ebu-acip.org). Audio over IP (Internet Protocol) terminals are increasingly being used in radio operations for streaming of radio programs over IP networks from remote sites or local offices into main studio centers. The Internet is increasingly also used for various scenarios of video/audio/multimedia contribution, especially over longer distances. News correspondents will have the choice in their equipment to use either ISDN or the Internet via ADSL or other available IP networks to deliver their reports. With very few exceptions, IP equipment from one manufacturer has until now not been compatible, let alone synchronizable, with another manufacturer's unit.

One approach to signal synchronization is outlined in U.S. Pat. No. 6,191,821 (Kupnicki). Another approach is provided in FR 2007/050918, which is directed to transmitting a synchronizing signal in a packet network having two or more stations. Image cues are extracted from a synchronizing signal. A first counter is initialized based on the image cues. A program dock reference counter is initialized every second or higher zero crossing of the first counter. The program clock reference counter samples all the Tech periods. Tech is derived from a time base synchronized on all the network stations. Packets containing the samples are transmitted in the network. The synchronizing signal is a Genlock signal. The time base synchronized on all the network stations is an IEC 1588 time base.

Another example is FR 2007/050919, which is directed to a secure mechanism for transmission of a synchronizing signal in a packet network. A device transmits packets in a packet communication network comprising two or more stations. The device has a signal receiver and can control a counter using the received signal. The counter samples every Tech periods. Tech is derived from a time base synchronized on all the stations of the network. An incremental value predicting at least a next sampled value of the counter is calculated. Sampled values and associated incremental values are transmitted in packets. The time base synchronized on all the network stations is an IEC 1588 time base. The received signal is of Genlock (synchronization lock) signal. The communication network is an IP (Internet Protocol) network.

Still another example is FR 2007/050914, which is directed to generating and operating a double temporal descriptor for transmitting a synchronizing signal in a packet network. Packets are transmitted in a packet communication network comprising two or more stations. A signal receiver is adapted to derive a frequency and a phase from a received signal. A master counter is provided and initialized by the derived frequency and phase. A sampling device samples the value of the master counter at regular intervals. From a sampled value of the master counter, a first temporal descriptor is generated. A second counter is synchronized on all network stations at the same instant when the sampling of the master counter occurs. A second temporal descriptor is generated from a sampled value of the second counter. The two temporal descriptors are jointly transmitted in the network. The packet communication network is an IP network. The second counter is synchronized on all the network stations by means of the IEC 1588 standard. The received signal is a Genlock signal.

SUMMARY OF THE INVENTION

A system as disclosed herein for synchronizing unrelated information and/or reference signals originating from a plurality of broadcasting/multimedia equipment sources, where the signals may be in different signal formats and/or subject to different delays at a receiving device. The system may include a data network including at least one network time service. A plurality of slave information and/or reference signal generators are provided, at least one of which may be operable to accept the timekeeping data from the network time service as an input to generate an information and/or reference signal. The phase of the information and/or reference signal may be calculated based on the time elapsed since an initial time point. The at least one slave information and/or reference signal generator may include a reference time counter to generate time data elapsed from the initial time point. The reference time counter may be connected to a source of network distributed time data. The reference time counter may be clocked by a local time base, and/or the reference time counter may be part of a phase locked loop circuit locking the reference time counter using the incoming network time and the locally running slave time data.

A master reference time generator may also be provided for transmitting signals for synchronizing unrelated information signals originating from two or more broadcasting/multimedia equipment sources, where the signals may be in different signal formats and/or subject to different delays at a receiving device. The data network distributed timekeeping service may be provided by the master generator, which may be assigned to be the master reference time generator.

A slave information signal generator may be connected to a data network for receiving the network distributed timekeeping service, where the time may be transmitted by the master reference time generator. The slave information signal generator may be operable to regenerate the counting of the master reference generator time counter, preferably by a phase locked loop. The slave information signal generator may be adapted to calculate a phase of an information reference signal based on the time elapsed since an initial time point. The time network distributed timekeeping is provided by an instance of IEEE1588 or ISO/IEC 61588 implemented on an IP network.

A method is also provided for synchronizing unrelated information and/or reference signals originating from two or more broadcasting/multimedia equipment sources, where the signals may be in different signal formats and/or subject to different delays at a receiving device. The method may include providing a data network including at least one network time service and a plurality of slave information and/or reference signal generators, wherein at least one of the slave information and/or reference signal generators may be operable to accept the timekeeping data from the network time service as an input to generate an information and/or reference signal. The method may further include generating time data elapsed from the initial time point by the at least one slave information and/or reference signal generator, which may include a reference time counter. The method may also include connecting the reference time counter to a source of network distributed time data, and calculating the phase of any reference and/or information signal based on its phase at an initial time point.

The method may additionally include connecting at least one master reference time generator to the data network, where the at least one master reference time generator provides one or more distributed time services to all devices on the network. Further, at least one of a plurality of slave devices may be connected to the data network, and each of the slave devices may be capable of accepting the distributed time data as an input to generate a reference signal having a phase calculated based on the time elapsed since an initial time point.

In addition, the method may also include accepting, at the master reference time generator, an absolute time reference as an input which is either an externally provided time, or an optional time base to load and clock the time of the master reference time generator. The time and time base may also be local to the master reference time generator. Further, in at least one of the slave reference signal generators, a reference time counter may be clocked by a local time base, and/or a phase locked loop may be implemented to lock the slave reference time counter using the incoming network distributed time and the locally running slave reference time data. Further, at device startup, the counter at the slave reference signal generator with the most recently received reference may load the time count. The method may also include distributing a time reference signal over an IP network to synchronize, in the sub-microsecond range, broadcasting/multimedia devices using the same network that also transports the TV/radio/multimedia information data.

An arbitrary point in time may be selected as the initial time point (t=0) (i.e., epoch), at which all unrelated information and/or reference signals, their clock edges, and their phase relationships are deemed to be in alignment. The slave reference time counter may further deterministically generate an epoch-aligned signal. A network distributed timekeeping service may be provided to the master reference time generator and the slave reference signal generators on the network. The master reference time generator may be adapted to accept an absolute time reference as an input, which may be an externally provided time, an optional time base to load and clock the counter of the master reference time generator, or the time and time base may be local to the master reference time generator.

A precision time counter may be locked to an external source of time, such as GPS. The master generator may deliver the timekeeping information from the precision time counter to a plurality of slave devices, which may then lock their counters to the master as described herein. Thus, the master and slaves may all have time counters running in synchronism. These time counters may be used to synthesize an information or other signal of the broadcasting/multimedia equipment sources. This is accomplished using a network timekeeping service, such as IEEE1588 or ISO/IEC61588.

The phase of all reference signals of interest are defined at some prior point in time (i.e., the epoch). Thus, the phase of any reference signal may be calculated at a subsequent point in time. The slave generators may generate a desired reference signal with a known relationship to absolute time, and thus multiple slave generators may independently generate synchronous copies of the same signal. These aligned reference signals may then be used to align independent information signals. This approach provides for time being derived from an external global source, and being instantiated in the master generator.

Reference signals such as Genlock signals traditionally take the form of an information signal. Slave devices may be of various types which use a Genlock reference. One type produces legacy reference Genlock signals in the form of information signals. Another type is an actual content (media) processing device which directly generates information signals. Typically, such a device would be locked to the reference Genlock signal. The apparatus/methods described herein may be used to generate reference signals (as information signals in a slave generator) that are in turn used to lock other equipment (which handles the content, also as information signals). The output of that equipment is in the form of information signals. This method may also be used to allow the content handling devices to directly generate the output information signals without the use of an intermediate reference signal.

DETAILED DESCRIPTION OF THE PREFERRED EMBODIMENTS

Figure 1:
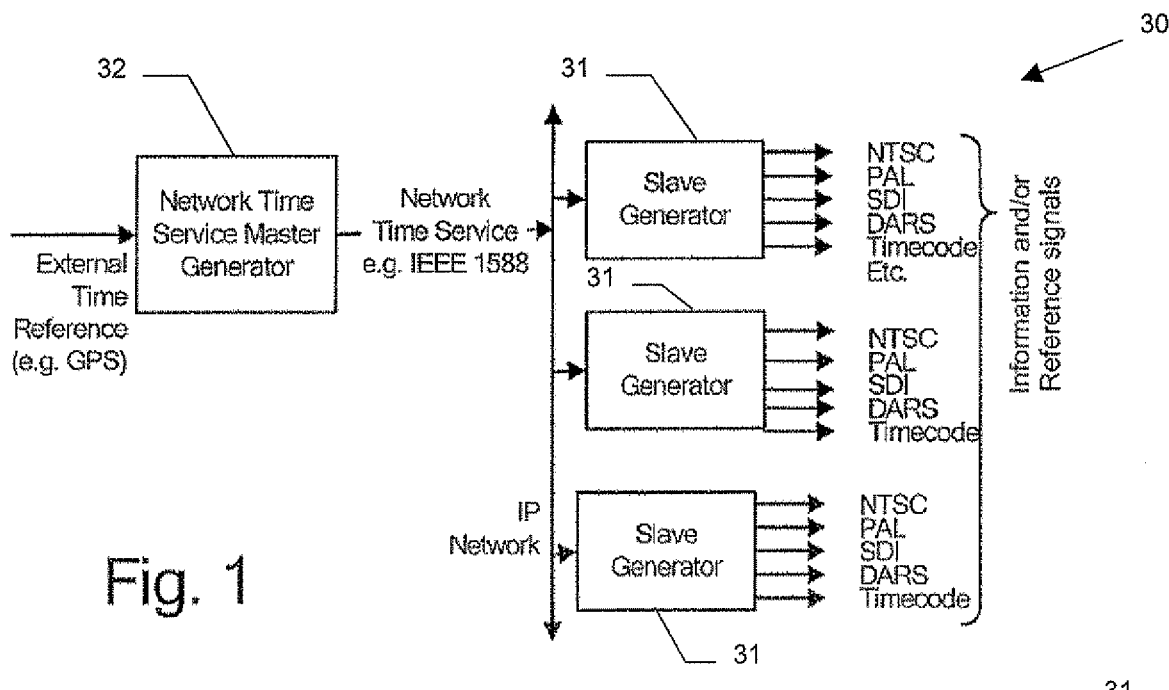
FIG. 1 is a schematic block diagram of a system for synchronizing signals at multiple slave devices with a master generator that provides a distributed precision network time service to the slave reference signal generator devices in accordance with the invention.

Distributing a Genlock reference signal over a (non-deterministic) IP network allows for synchronization of the broadcasting/multimedia equipment. Using an IP network time distribution system provides synchronized time in each receiving (i.e., slave) device to be Genlocked. There is no direct transfer of a time base (frequency) from master to slave, only the transfer of a precise (absolute) time. Through the precise timekeeping counter operating in the slave device and the slave device being "fed" as proposed herein, the slave time base frequency may be locked to that of the master using a PLL or other technique.

A technical problem that is addressed with the present system/method is the deterministic generation of one or more related or unrelated reference signals across a packet-switched network with non-constant transmission time. While prior art concepts such as FR 2007/050918 extract "image cues" from video and operate a program clock reference (PCR) counter at a certain frequency (i.e., 27 MHz), the present system/method uses high precision time distributed via a non-deterministic packet oriented network, and operates a time counter at a desired frequency to synchronize slaves to a master. The present system/method uses an IP network for distribution of precise time in packets to provide Genlock synchronization data/signals.

A Precision Time Protocol (PTP), such as IEEE 1588, allows for a very precise time synchronization via an IP or other non-deterministic packet oriented network such as Ethernet. This protocol allows for the synchronization, in the sub-microsecond range, of the broadcasting/multimedia devices using the same (Ethernet) network that also transports the TV/radio/multimedia data. Similar time synchronization protocols such as NTP and SNTP are not as well suited, as they do not achieve the required synchronization accuracy or the convergence speed. A timekeeping service such as IEEE 1588 which provides a distributed time service using private traffic on an IP network, is optimized through the use of specialized switches.

In the present method/system, the time count and time base may be derived from a global source (such as GPS), or any other precise electronic clock that creates its own timing signals for synchronization and measurement purposes downstream (e.g., time base). According to the present method/system, a signal phase is declared at some epoch (t=0), and such signal may be deterministically regenerated by one or more slaves, such that the output signals of those slaves (which are independent of each other) will be synchronous.

An arbitrary point in time is selected as the initial time point (t=0), the epoch at which the unrelated information and/or reference signals, their clock edges, and their phase relationships are deemed to be in alignment. A network distributed timekeeping service provides the "master" functionality.

At the master reference time generator, an absolute time reference may be accepted as an input which is either an externally provided time, or an optional time base to load and clock the counter of the master reference time generator. Additionally, the time and time base may be local to the master reference time generator.

At least one of the slave reference signal generators may clock a reference time counter by a local time base. A phase locked loop may be implemented to lock the slave reference time counter using the incoming master reference time and the locally running slave reference time data. At device startup the counter at the slave reference signal generator may be loaded with the most recently received reference time count. On an ongoing basis, the slaves receive the network distributed time. By comparing their internal time count with the incoming time, their time base is adjusted to achieve synchronous operation with the master time count.

In order to have a set of slave devices determine the offset between time measurements on their clocks and time measurements on a master device, the following procedure may be used. This method is, however, only one exemplary approach. Numerous other approaches may also be used for the present system/method. The running time count in the slave is then used to derive information and/or reference signals.

Let the variable t represent physical time. For a given slave device, the offset $o(t)$ at time t is defined by: $o(t)=s(t)-m(t)$, where $s(t)$ represents the time measured on the slave device's clock at physical time t, and $m(t)$ represents the time measured on the master device's clock at physical time t. Let the master device periodically launch an exchange of messages with slave devices to allow each slave clock re-compute the offset between its clock and the master's clock.

An initial assumption is that the exchange of messages happens over a period of time so small that this offset can basically be considered constant. Another assumption is that the transit time of a message going from the master to a slave is equal to the transit time of a message going from the slave to the master. It is further assumed that both the master and slave can measure the time they send or receive a message. The degree to which these assumptions are enforced regulates the accuracy of the offset measured at a slave device.

Each message exchange begins with a SYNC message sent by the master clock to all the slaves listening. The master time stamps the time T1 measured on its clock when it sends this message. A slave receiving this SYNC message takes note of the time T2 measured on its clock when it receives this SYNC message. If d is the transit time of this SYNC message, and õ is the constant offset during this transaction, then $$T2-T1=õ+d. \qquad (1)$$

Each slave now sends a RESPONSE message back to the master. The slave measures the time T3 that the slave sends this RESPONSE message, and the master measures the time T4 that the master receives this RESPONSE message. The master then sends a directed multicast TIME T4 message back to the slave to notify the slave what time the master received the RESPONSE message, here:

$$T4-T3=d-õ. \qquad (2)$$

The slave now knows times T1, T2, T3, and T4. Combining the above two equations (1) and (2), the offset during this transaction, namely $$õ=\tfrac{1}{2}\cdot(T2+T3-T1-T4),$$

may be computed in an appropriate computing device at the slave. The slave now knows the offset õ during this transaction. While this offset may drift with time, it will be corrected the next time this exchange of transactions is carried out.

The master reference generator, which has an absolute time input from a highly stable time source, e.g., an atomic clock or the Global Positioning System (GPS), generates a master reference signal. A time counter, which may be resolved to the order of picoseconds, is implemented from the initial time point. The time elapsed from the initial time point is periodically encoded into the master reference signal as time code data, e.g., multiple bit words including an integer part that denotes the number of seconds and a fractional part that denotes the number of fractional seconds that have elapsed since the initial time point.

The slave generator associated with each information signal is Genlocked to the master reference signal, and the various information signals are locked to their respective slave reference outputs. Each synchronizing event is associated with time code data specifying the absolute time (relative to the initial time point) of the synchronizing event. Two signals may thus be aligned by delaying one of the signals according to a delay constant representing the phase offset of the signal as encoded into the previous frame of its associated slave reference signal. Thus, signal timings are detected in advance of the synchronizing event. This approach may be applied to synchronize reference signals in numerous formats, including but not limited to NTSC, PAL, AES, MPEG-2, Timecode, Time of Day, ATSC, and HDTV. Two TV studios, possibly in geographically different locations, may be precisely synchronized via the Internet using a GPS system or another precise time source, so that transmission from one to the other would be synchronous and signal timings would be known in advance.

Turning now to FIG. 1, a system 30 for providing synchronization of signals at multiple slave devices is now described. In the system 30, by way of example, a master network time generator 32 provides distributed precision network time service to the slave generator devices 31 using a service such as IEEE 1588. The slave devices 31 receive the network distributed time and use this information to deterministically generate video and audio information and/or reference signals. The independent slave generators 31 will produce signals which are time-aligned and synchronous with each other. The master generator preferably accepts an input from a time source, for example a highly stable reference such as an atomic clock or the Global Positioning System (GPS). Alternatively, the master generator 32 can run on its own internal oscillator using last known time information. This generator 32 may be specific to the implementation of a broadcast system, or may simply be the local "house time" on the managed network infrastructure.

One mechanism suited for enabling the present concept is a network timekeeping service, such as IEEE 1588 or IEC/ISO 61588, which provides a distributed time service using private traffic on an IP network, and may be optimized through the use of specialized switches. The reason for the specialized switches is that the precision of the protocol also depends on the latency jitter of the underlying network topology. Point-to-point connections provide the highest precision, with hubs imposing very little network jitter. Under very low or no network load, ISO Layer 2 switches have a very low processing time, typically 2 µs to 10 µs plus packet reception time. Switches with about 0.4 µs latency jitter are also available. However, switches are working with queues and store and forward, so only one queued maximum length packet imposes a delay for the following packet in the 100 µs range, and under high load conditions, more than one packet will be in the queue. Another factor for the precision of the protocol is that latency is entirely symmetric for both directions: from the master 32 to the slave 31 and vice-versa.

Reference signals are synchronized to align information signals associated with the reference signals. The information signals may be in different formats and/or may originate from different locations. As used herein an "information signal" or "information data" includes a signal which includes information in analog or digital form, e.g., video signals such as NTSC, PAL, SDI, MPEG-2, MPEG-4, and ATSC, and/or audio signals such as AES digital audio, MP3, MP4, etc. The present approach may be applied to information signals which are to be aligned for superimposition, combination, integration, etc. by a broadcasting facility, editing facility or the like.

The master generator 32 reads time information from the absolute time input and synchronizes its IEEE 1588 generator to it. By use of the associated external time base (e.g., from GPS), the IEEE 1588 master generator 32 can provide extremely accurate time distribution to the slave devices 31.

An arbitrary point in time is selected as an initial reference point (t=0), and unrelated timing signals, clock edges and phase relationships are deemed to be in line at this initial reference point. The Genlock time data will be used to calculate the position of each information signal at any later point in time at which the information signals are to be integrated or combined, and thus to calculate the phase offset of each signal relative to the other(s) so that compensating delays may be applied.

The slave generators 31 are each locked to the IEEE 1588 network time. Compensation procedures within the IEEE 1588 protocol provide for delay compensation between the master 32 and each slave 31, and thus ensure that each slave contains the same absolute time data at any instant in time. Using the time data, the slave 31 is able to synthesize output signals and their time bases. For any signal previously defined in phase at some prior point in time, it is possible to calculate by software the phase of that signal at any other point in time. The slave 31 employs the necessary calculations to derive the required phase for its output signals from the ongoing timekeeping data.

Figure 2:
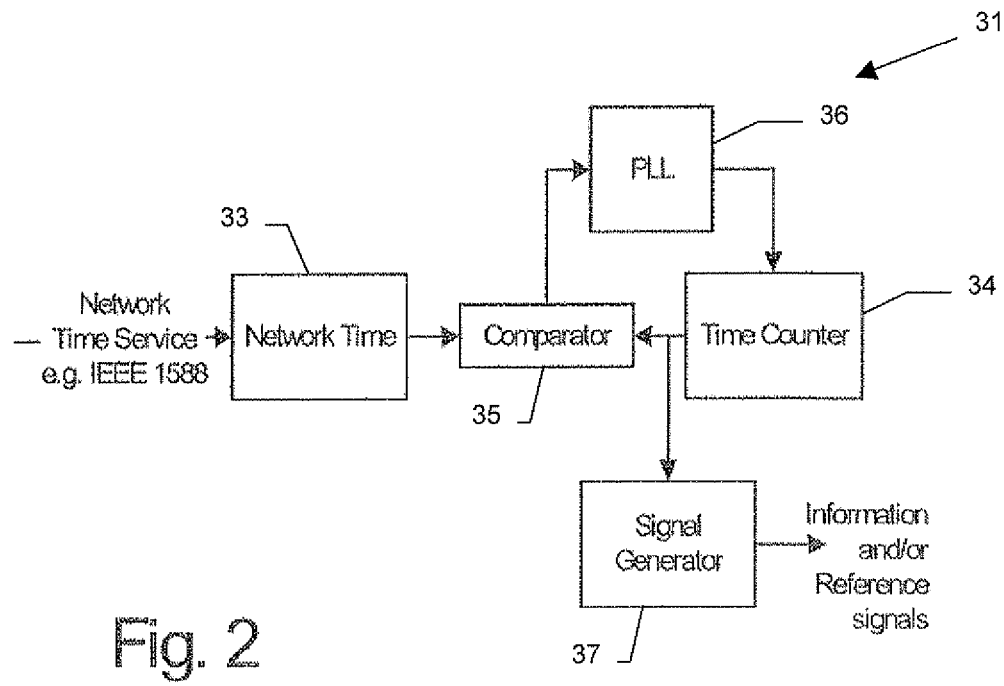
FIG. 2 is a schematic block diagram of a slave reference and/or information signal generating device of the system of FIG. 1.

The slave reference generator device 31 illustrated in FIG. 2 includes a network time model 33 that receives the network distributed time service (e.g., IEEE 1588), and provides an ongoing time count. In addition, a reference time counter 34 is implemented, and is clocked with a local time base to provide a clock output to a signal generator 37. This time is compared with the received network time by a comparator 35 and an error value is produced. This error represents the time difference between the local reference time counter 34 and the network distributed time. This error value is used to steer the frequency of the local time base such that if the local counter 34 is at an earlier count value than the master counter 32 at the time of comparison, the time base frequency is raised to increase the count rate of the local counter. Conversely, if the local counter 34 has a greater count value than the master 32, the time base frequency is reduced.

From comparison to comparison, the frequency error of the local time base in the slave 31 may be measured as an error in timekeeping, and this information may be used to steer the local time base to the correct frequency over time, using loop filtering techniques. As a result, the slave Genlock time counter will be synchronous to the Genlock time counter in the master and signals derived from each slave will be synchronous to each other.

At startup or reconnection to the network after some time of standalone operation, the slave Genlock counter 34 may differ significantly from the master count such that in inordinate time would be required to synchronize counts by offsetting the local time base due to limits in the time base offset allowed by certain reference signal standards. In this event, a loop management algorithm would initiate loading the local Genlock counter 34 with the master sampled value to achieve fast lock. Phase locking would commence thereafter using a phase locked loop (PLL) 36. Now running in sync with the master counter 32, the slave counter 31 may be used to synthesize Genlock reference signals.

Figure 3A:
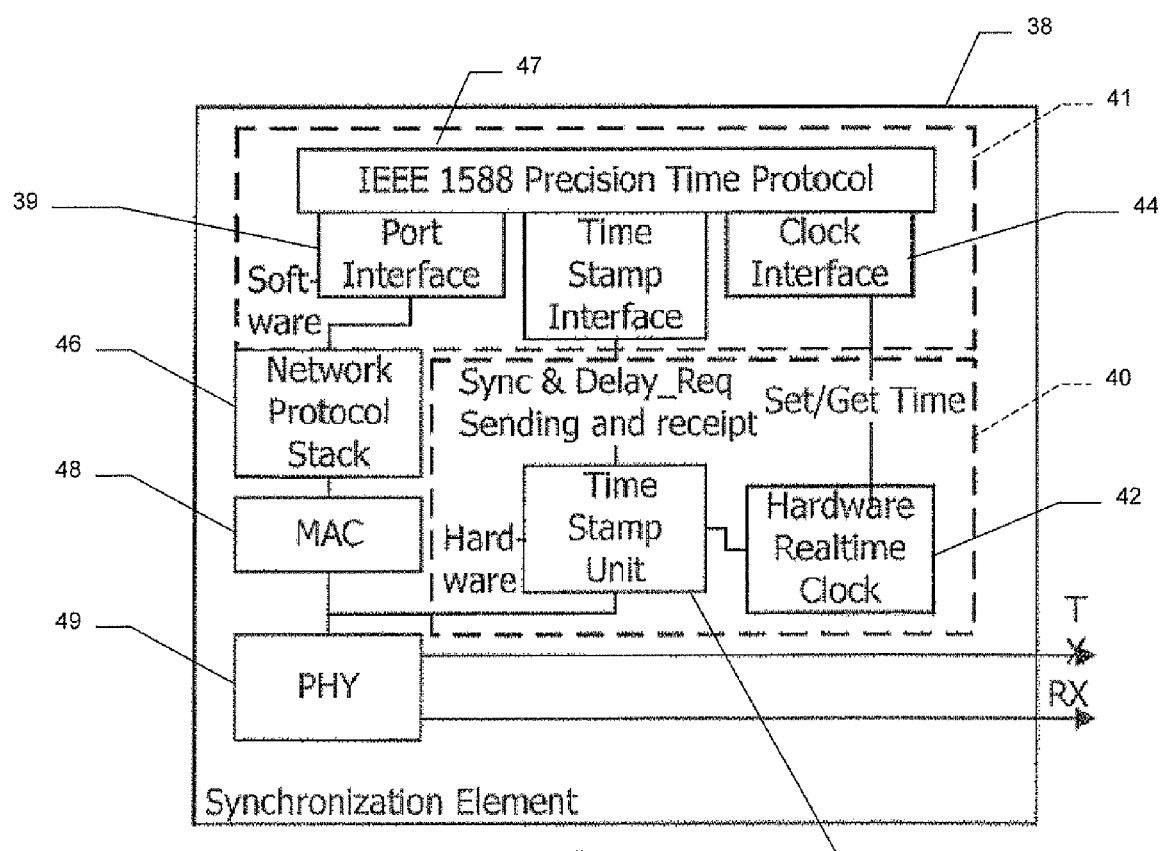
FIG. 3a is a schematic block diagram showing hardware and software components of a synchronization element in accordance with an exemplary embodiment.

The architecture of the master generator is based on the concept to separate the time-critical part, which is implemented in hardware 40, and the protocol itself, which is decoupled from hard real-time conditions, i.e., the software part 41. Thus the protocol may be executed in a low priority process and/or on a processor with relatively low performance requirements. The master generator 33 has a highly precise real-time clock 42 and a time stamp unit (TSU) 43 to generate the time stamp. The software part implements the actual IEEE 1588 protocol 47 with an interface to the real-time clock 44 and the hardware time stamp unit 45. FIG. 3a illustrates the cooperation of the hardware and software components of an IEEE 1588 synchronization element 38. A network protocol stack 46 and MAC/PHY layers 48, 49 interface with the software part 41 via a port interface 39.

Figure 3B:
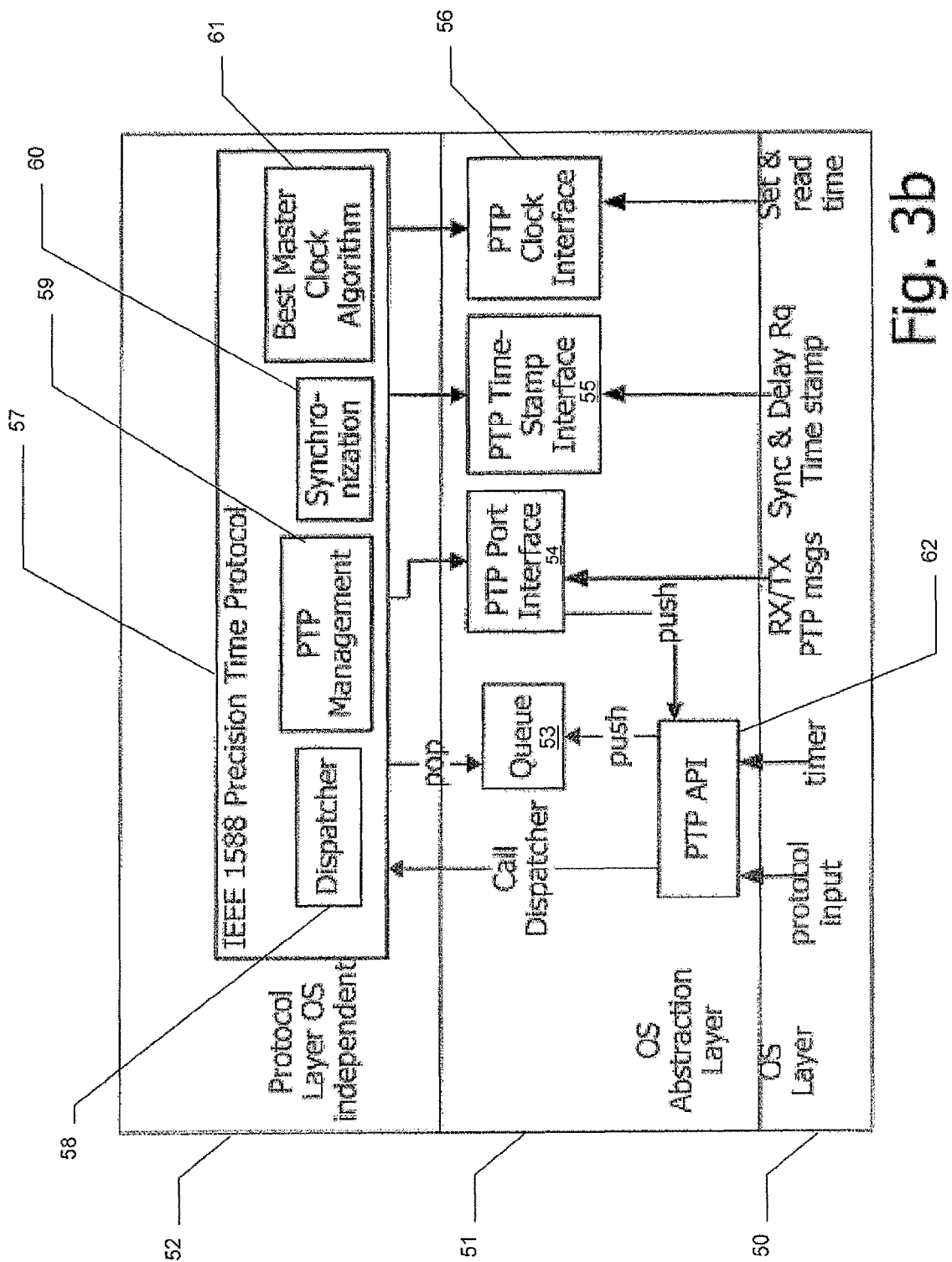
FIG. 3b is a schematic block diagram showing the interaction of the individual layers in accordance with an exemplary embodiment.

The intention of this architecture supports an Operating System (OS) 50 independent modeling of the software component. Three layers with different abstraction level are provided. The Protocol Layer 52 implements the operating system independent Precision Time Protocol (PTP). The OS Abstraction Layer 51 forms the interface between PTP and the selected operating system. The functions made available by the operating system—tasks/processes, semaphores, timers, sockets, etc.—are merged over the OS Layer 50. FIG. 3b illustrates the interaction of the individual layers. In particular, a network time counter 80 receives the network time (e.g., 1588 time), and outputs a network time count to a latch 81. Similarly, a Genlock time engine 84 receives an external time reference (e.g., GPS), and outputs a Genlock time count to a latch 85. Respective future time calculation modules 82, 86 are coupled to the latches 81, 85, and their respective outputs are coupled to a packet sender 83.

The Protocol Layer 52, which is OS independent, implements PTP for the synchronization of the devices in the IP network in a network. The actual processing for synchronizing the individual communication elements is located here. Within the Protocol Layer 52, the protocol dispatcher ensures the atomic execution of functions during an individual process. The communication between the protocol and the OS Abstraction Layer 51 is implemented by a queue 53 and three interfaces 54-56. The protocol layer OS 52 implements an IEEE 1588 precision time protocol 57 illustratively including a dispatcher 58, PTP manager 59, synchronizer 60 and master clock algorithm 61. A PTP API couples protocol and timer inputs from the OS layer 50 to the OS obstraction layer 51.

The middle layer, i.e. the OS abstraction layer 51, encases operating system dependent functions, which are to be adapted to the devices actually present in the network. The Timestamp Interface 55 provides the Precision Time Protocol with the seized time stamps of the Sync and Delay-Request messages. However, depending upon the stage of the precision requirement, either a Hardware unit, i.e. the TSU, or the software generates the time stamps. One possibility to generate "software time stamps" is in the operating system dependent NIC drivers (RX-ISR, sends process)—as near as possible at the transportation medium. The local clock is read and modified via the Clock Interface.

Implementations which do not have a hardware real-time clock can use the system clock of the operating system or optimized solutions as for example the nano-kernel under UNIX derivatives. Apart from setting the local clock, this interface contains the control algorithms which are responsible for the quality of time synchronization (accuracy, stability, transient behavior, etc.). The Port Interface 54 is used to dispatch and/or receive PTP messages. The IEEE 1588 telegrams use excluding UDP/IP multicast packets and thus make it possible to send and receive them over the socket interface of the IP protocol stack.

A clock or timer is a device providing a measurement of the passage of time since a defined epoch. There may be two types of clocks: boundary clocks and ordinary clocks. A boundary clock is a clock with more than a single PTP port, with each PTP port providing access to a separate PTP communication path. Boundary clocks are used to eliminate fluctuations produced by routers and similar network elements. The point in the outbound and inbound protocol stacks where this timestamp is generated is called the clock timestamp point.

The communication of PTP information between two PTP clocks with no intervening boundary clock is a direct communication. It is often desirable to synchronize a single clock to an external source of time, e.g., to a GPS system to establish a UTC time base. This synchronization is referred to as external synchronization. The reference time defining the origin of a time scale is termed the epoch. Within a collection of clocks one clock, the grandmaster clock, will serve as the primary source of time to which all others are ultimately synchronized. Within each region there will be a single clock, the master clock, serving as the primary source of time. The master clocks will in turn synchronize to other master clocks and ultimately to the grandmaster clock. Sync and Delay_Req messages contain a distinguished feature, the message timestamp point, serving as a reference point in these messages. When the message timestamp point passes the clock timestamp point, a timestamp is generated and used to compute the necessary corrections to the local clock. An ordinary clock is a clock with a single PTP port.

PTP is an acronym for Precision Time Protocol. A PTP domain is a collection of one or more PTP sub-domains. There are five designated message types: Sync, Delay_Req, Follow-up, Delay_Resp, and Management. PTP messages can be communicated via a multicast. In this style of communication any node may post a message and all nodes will receive this message.

A PTP port is the logical access point for communications to the clock containing the port. Two clocks are synchronized to a specified uncertainty if they have the same epoch and measurements of any time interval by both clocks differ by no more than the specified uncertainty. The timestamps generated by two synchronized clocks for the same event will differ by no more than the specified uncertainty.

While preferred apparatuses and methodologies having been thus described by way of example only, it will be apparent to those skilled in the art that certain modifications and adaptations may be made without departing from the scope of the appended claims.

That which is claimed is:

1. A system for synchronizing signals comprising:
a data network comprising a master network time generator configured to provide network timekeeping data, the network timekeeping data comprising a distributed time service generated based upon a time reference; and
a plurality of slave signal generators coupled to the data network and configured to receive the network timekeeping data from the master reference time generator;
at least one of the plurality of slave signal generators configured to accept network timekeeping data from the at least one master network time generator as an input to regenerate a count from the master reference time generator and generate a signal having a phase calculated based upon an elapsed time since an initial time point;
the at least one slave signal generator comprising a reference time counter for receiving network distributed time data and generating elapsed time data with respect to the initial time point.

2. The system of claim 1 wherein the reference time counter generates local time data based upon a local time base.

3. The system of claim 2 wherein the at least one slave signal generator further comprises a phase locked loop circuit for locking the reference time counter based upon the network timekeeping time and the local time data.

4. The system of claim 1 wherein the network timekeeping data is in an IEEE1588 format.

5. The system of claim 1 wherein the network timekeeping data is in an ISO/IEC61588 format.

6. The system of claim 1 wherein the system is for synchronizing signals from at least one of a broadcast signal source and a multimedia signal source.

7. A signal generator to be coupled to a data network comprising at least one network time generator configured to generate network timekeeping data comprising a distributed time service generated based upon a time reference, the signal generator comprising:
at least one processor comprising
an input module configured to accept the network timekeeping data from the network time generator, regenerate a count from the master reference time generator, and generate a signal having a phase calculated based upon an elapsed time since an initial time point; and
a reference time counter for receiving network distributed time data and generating elapsed time data with respect to the initial time point.

8. The signal generator of claim 7 wherein the reference time counter generates local time data based upon a local time base.

9. The signal generator of claim 8 wherein the at least one processor further comprises a phase locked loop circuit for locking the reference time counter based upon the network timekeeping data and the local time data.

10. A signal synchronization method comprising:
coupling a plurality of slave signal generators to a data network comprising at least one master network time generator;
providing network timekeeping data from the master reference time generator to the plurality of slave signal generators, the network timekeeping data comprising a distributed time service generated based upon a time reference;
operating at least one of the plurality of slave signal generators to accept the network timekeeping data from the at least one master network time generator as an input, regenerate a count from the master reference time generator, and generate a signal having a phase calculated based upon an elapsed time since an initial time point; and
receiving network distributed time data at the at least one slave signal generator and generating elapsed time data with respect to the initial time point based thereon.

11. The method of claim 10 wherein the at least one slave signal generator comprises a reference signal counter; and further comprising generating local time data at the at least one slave signal generator using the reference signal counter.

12. The method of claim 11 further comprising locking the reference time counter based upon the network timekeeping time and the local time data.

13. The method of claim 11 further comprising loading a most recent received reference time count for the reference time counter upon startup.

* * * * *